(12) United States Patent
Srinakruang

(10) Patent No.: US 8,404,911 B2
(45) Date of Patent: Mar. 26, 2013

(54) PROCESS FOR PRODUCING FUEL FROM VEGETABLE OIL BY USING ORE CATALYST

(76) Inventor: Jumluck Srinakruang, Bangkok (TH)

( * ) Notice: Subject to any disclaimer, the term of this patent is extended or adjusted under 35 U.S.C. 154(b) by 316 days.

(21) Appl. No.: 12/788,986

(22) Filed: May 27, 2010

(65) Prior Publication Data

US 2011/0289826 A1    Dec. 1, 2011

(51) Int. Cl.
*C07C 1/00* (2006.01)
(52) U.S. Cl. .................................... 585/240
(58) Field of Classification Search ............. 585/240; 201/2.5, 25
See application file for complete search history.

(56) References Cited

U.S. PATENT DOCUMENTS

| | | | | |
|---|---|---|---|---|
| 2,551,579 | A | * 5/1951 | Berl | 536/122 |
| 5,264,640 | A | * 11/1993 | Platz | 585/241 |
| 2009/0112007 | A1 | 4/2009 | Lin et al. | |
| 2009/0259082 | A1 | 10/2009 | Deluga et al. | |
| 2009/0301930 | A1 | 12/2009 | Brandvold et al. | |

OTHER PUBLICATIONS

Ngamcharussrivichai, C. et al., Modified dolomites as catalyst for palm kernel oil transesterification, 2007, Journal of Molecular Catalysis A: Chemical 276, pp. 24-33.*
Tani et al.; Development of Direct Production Process of Diesel Fuel from Vegetable Oils; Journal of the Japan Institute of Energy, 90, pp. 466-470 (2011).
D. Dayton; A Review of the Literature on Catalytic Biomass Tar Destruction, Milestone Completion Report; Dec. 2002; retrieved from http://webdev.its.iastate.edu/webnews/data/site_biorenew_reading/23/webnewsfilefield_file/CatalyticBiomass.pdf.

* cited by examiner

*Primary Examiner* — Cephia D Toomer
(74) *Attorney, Agent, or Firm* — Sughrue Mion, PLLC

(57) ABSTRACT

A process for producing fuel by cracking vegetable oil in a pure state or mixed with a residual hydrocarbon oil, which is obtained from a pyrolysis process, using a dolomite catalyst. The residual hydrocarbon is produced by the pyrolysis of plastic waste, such as of one or more of polyethylene, polystyrene or polypropylene. The mixture of vegetable oil and the residual hydrocarbon oil is first subjected to a semi-batch catalytic cracking reaction over a very low cost dolomite catalyst to obtain high quality oil for fuel, which comprises mainly light and heavy naphtha. Moreover, the catalytic cracking reaction is conducted at operating temperatures lower than 450° C.

16 Claims, 1 Drawing Sheet

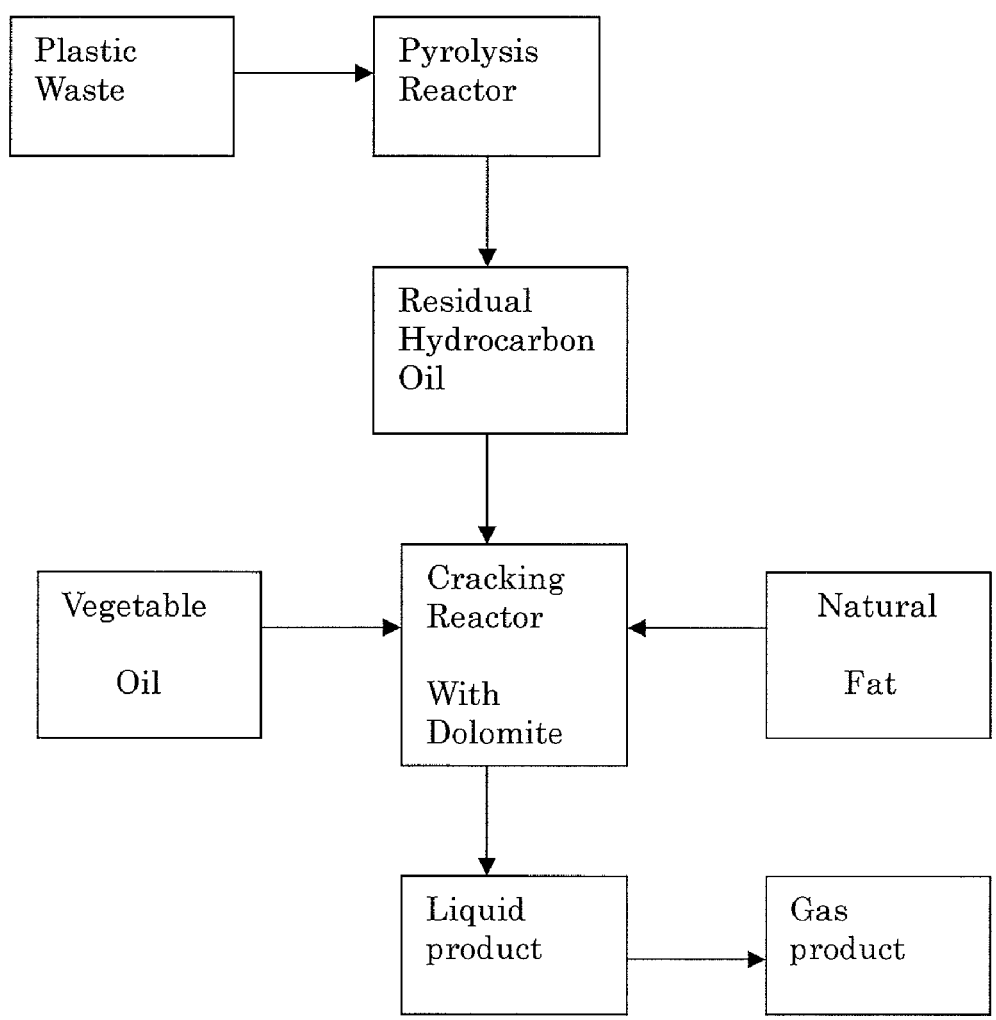

PROCESS FOR PRODUCING FUEL FROM VEGETABLE OIL BY USING ORE CATALYST

BACKGROUND OF THE INVENTION

1. Field of the Invention

The present invention relates to a process for producing fuel by a catalytic cracking of vegetable oil that may be used in a pure state or mixed with fats and/or residual hydrocarbons from plastic pyrolysis by using ore-dolomite derived catalyst. This process transforms vegetable oils having high viscosity and heat content into high quality oil for fuel such as light and heavy naphtha, kerosene and diesel oil, in which glycerin is not produced as a byproduct in the transesterification process.

2. Description of the Related Art

Recently, the increasing price of crude oil, limited resource of fossil fuel (petroleum, coal and natural gas) and environmental concern lead to a new research where the use of alternative source and renewable energy such as biomass, solar, hydrogen and wind energy are being focused.

One of the most promising processes seems to be the conversion of vegetable oil, which primarily contains triglycerides and free fatty acid, to biodiesel because of its environmental benefit, for example low toxicity, biodegradability, lower sulfur content and finally limitation on greenhouse gas. Moreover, the well-known advantage is that the vegetable oil is one of the renewable resources.

Methyl or ethyl ester (biodiesel) is usually made from vegetable or animal oil via transesterification with alcohol in the presence of alkali as a catalyst. Methanol is commonly used for biodiesel production because of its availability and low cost. However, methanol is toxic and has a risk of fire. Biodiesel can be blended with petroleum diesel oil. It may, however, present somewhat of a drawback. The burning of methyl or ethyl ester of fatty acids generates formaldehyde and benzene, with deposit formation which causes damage to engines and pistons of engines. Thus, it is necessary to find a process to convert vegetable oil to high quality fuel oil which has a superior quality and physical characteristics that are very close to those of petroleum fuels.

Catalytic cracking process of vegetable oil for the production of fuel oil is one of the most promising methods because of its superior quality by having hydrocarbons which are mainly used for diesel oil.

U.S. Pat. No. 4,102,938 discloses a process for producing hydrocarbons from vegetable oils by thermolyzing them in the presence of a silica-alumina catalyst impregnated with any one of the oxides of the transition metals of groups IIB, IIIB, IVB, VB, VIB, VIIB and VIII of the Periodic Table at temperature ranging between 300° C. and 700° C. under atmospheric pressure in a fluidized bed, moving bed or fixed bed continuous tubular reactor, separating and purifying the resulting hydrocarbons.

However, there needs to be a great effort to combine a mixture of mineral hydrocarbon oil (petroleum kerosene of paraffin base) with vegetable oil through a process of hydrotreatment. US patent application publication No. 2007/0260102 discloses that the mixture flow is submitted to the process of hydrotreatment, obtaining as a result, a product flow with an elevated content of N-paraffins in the range of $C_{10}$-$C_{13}$.

The amount of plastic waste has been rapidly increasing every year which causes serious pollution problem. It requires landfill disposal, however, available landfill is limited. Thus, plastic waste is considered to be recycled by the thermo decomposition to obtain a petroleum resource. In view of lower capital cost, plastic waste is subjected to thermal cracking by a pyrolysis process to produce a heavy oil and then catalytic cracking to gasoline.

Some patents disclose that FCC catalyst is used in the catalytic cracking process of vegetable oil which is mixed with heavy or residual petroleum to produce diesel oil. For example, US patent application publication No. 2008/0313955 discloses a thermocatalytic cracking process for the production of diesel oil from a charge of vegetable origin made from seeds of oleaginous plants in refineries possesses at least two FCC reactors. At least one of such reactors processes heavy gas oil or residue under conventional conditions while at least one of such reactors processes the charge of vegetable origin made from seeds of oleaginous plants under conditions suitable, for production of diesel oil. Moreover, the diesel oil produced by the process has a cetane number over 40.

US patent application publication No. 2009/0026112 describes a fluid catalytic cracking process for the preparation of cracked products by contacting in a reactor a hydrocarbon feed stock with a cracking catalyst, wherein the hydrocarbon feedstock comprises a paraffinic feedstock and triglycerides.

U.S. Pat. No. 7,540,952 relates to a thermo catalytic process to produce diesel oil from vegetable oils, in refineries which have two or more catalytic cracking (FCC) reactors. This process employs the same catalyst employed in the FCC process, which processes conventional feedstocks simultaneously. At least one reactor processes heavy petroleum or residue in conventional operation conditions while at least one of such reactors processes the vegetable oil in proper operation conditions to produce diesel oil.

However, none of the above methods provides high quality oil for fuel with reasonable cost and with high efficiency.

SUMMARY OF THE INVENTION

A primary object of this invention is to provide a process for producing high quality oil for fuel which comprises mainly naphtha and gas oil by using a very low cost dolomite ore catalyst at an operating temperature from 250-600° C., preferably between 380° C. and 450° C. For this purpose, such vegetable oils are fed in a pure state or mixed together with other natural oil and/or residual hydrocarbon oil obtained from waste plastic pyrolysis.

Thus, the present invention relates to a process for producing fuel from vegetable oil by using a dolomite catalyst comprising: (a) preparing a raw material containing vegetable oil for cracking, and (b) performing pyrolysis for cracking by contacting said raw material with a dolomite catalyst, which is prepared by calcining natural ore dolomite at a temperature of 900° C. or above, to form a liquid material, and cracking said liquid material in a reactor by mixing said liquid material at a temperature from about 250° C. to about 600° C.

The present invention also provide a process for producing fuel from (1) vegetable oil alone or mixed together with natural fat and (2) residual hydrocarbon oil by using a dolomite catalyst comprising: (a) performing pyrolysis of plastic waste material to produce residual hydrocarbon oil for cracking, and (b) mixing said residual hydrocarbon oil with vegetable oil and a dolomite catalyst, which was prepared by calcining natural ore dolomite at a temperature of 900° C. or above, to form a mixture, and cracking said mixture in a reactor while mixing at a temperature from about 250° C. to about 600° C., so that said mixture in contact with the dolomite catalyst is decomposed and gasified.

BRIEF DESCRIPTION OF THE DRAWING

FIG. 1 is a schematic flow chart of the process according to an embodiment of the present invention, in which a feedstock such as vegetable oil, which is fed to the reactor, can be used in a pure state or mixed together with residual hydrocarbon oil.

DETAILED DESCRIPTION OF THE INVENTION

The principal characteristic of the present invention is to use a calcined dolomite catalyst for catalytic cracking of vegetable oil, which can be used in a pure state or mixed together with fats and or other natural oils, and further with residual hydrocarbon oils made from a plastic waste pyrolysis process to produce the high quality oil for fuel, which comprises mainly light and heavy naphtha and gas oil.

The catalyst used in the present invention is dolomite catalyst which is prepared by heat treating or calcining a natural ore dolomite at a temperature of 900° C. or above. The duration of the heat treatment is preferably from 2 hours to about 12 hours, more preferably from about 4 hours to about 6 hours. The heat treatment or calcination exceeding 6 hours is not harmful to the cracking reaction. However, a longer calcination time leads to high energy consumption. Suitable temperatures for calcination can range from about 900° C. to about 1,200° C., preferably from about 900° C. to 1,000° C. Increasing the calcination temperature above 1,000° C. does not influence the efficiency of catalytic activity. Calcination of natural ore dolomite may be performed under air or nitrogen gas condition.

It is to be understood that when dolomite is calcined at a temperature above 500° C., $MgCO_3$ contained in dolomite decomposes to MgO, and at a temperature above 800° C., $CaCO_3$ contained in dolomite decomposes to CaO. Therefore, the dolomite catalyst in the present invention is in an oxidized state. However, the inventor found that the dolomite will be active in the process of the present invention if it is calcined at a temperature of 900° C. or above before it is used in the reaction.

The dolomite catalyst with a particle size (average diameter) of 10~100 µm is preferable. More preferably, a catalyst having a diameter of about 10 µm is used in order to minimize the resistance to mass transfer between the catalyst and the plastics-derived liquid and able to achieve a high efficiency of catalytic cracking in a short contact time. The chemical composition of this ore-dolomite $(CaMg(CO_3)_2)$ is mainly based on $MgCO_3 \geq 41\%$, $CaCO_3 \geq 58\%$, and Si, Al, Fe and Sr are contained in a small quantity.

The feedstock or raw material which is subject to catalysis for producing high quality oil for fuel in the present invention is vegetable oil. Preferably, the vegetable oils such as palm oil, soybean oil, grape seed oil, olive oil, sunflower oil, corn oil, sesame oil and rice bran oil are used. More preferable vegetable oils for feedstock are palm oil and soybean oil which are widely grown in Thailand. Incidentally, mixtures of vegetable oils mentioned above may be used as raw material.

In the present invention, other natural oils including animal fats and/or fish oils may be added to vegetable oils as feedstock. Moreover, residual hydrocarbon oils made from plastic pyrolysis process may also be added to feedstock for catalysis. Process of producing such residual hydrocarbon oils will be described below.

Natural oils including animal fats comprise complex mixtures of triglycerides and other minor components, such as free fatty acids (FFAs), gum, waxes, etc. Triglycerides, the main component in natural oil, are esters of glycerol with three chains of aliphatic or olefinic FFAs of variable length (12-24 carbons). Not only triglycerides in natural oil but also free fatty acids may be converted to fuel oil during the process of the present invention. Moreover, the vegetable oil, animal oil and/or fish oil are not necessary to be in a pure form. In addition, the waste cooking oil can be used as a component of starting material or feedstock in this invention. The mixture of oils/fats from a different source may be used as a feedstock to the catalytic cracking process.

The cracking process of the present invention converts any kind of vegetable oils into fuel hydrocarbon at the reaction temperatures lower than 400° C. and obtains high purity of products for petroleum resource as well. Moreover, the process of the present invention converts any other oils which are in a pure state or mixed with residual hydrocarbons from waste plastics into fuel such as gasoline and diesel oil. The byproduct in the reaction is not glycerin in the transesterification process because the fatty acid molecules are cracked into the lighter components. In addition, the present inventor has found that the byproduct of this process is water that was generated from the oxygen in the triglycerides during the catalytic cracking step.

When the feedstock or raw material is contacted with the catalyst in a slurry reactor with high shear mixing at a reaction temperature of 250° C. to 600° C., preferably 380° to 450° C. under atmospheric pressure, the gaseous and liquid hydrocarbons are generated. The inventor found that the yield of hydrocarbon oils depends on the catalyst to feedstock ratio, temperature and reaction time. The catalyst to feedstock ratio is preferably between 0.15:1 to 2:1 g/g. A more preferable ratio of catalyst to feedstock is about 0.25:1 to 1:1 g/g. When a ratio of dolomite catalyst to feedstock is lower than 0.15, the feedstock is not able to contact the dolomite very well, resulting in a lower cracked oil yield and naphtha yield, which is not desirable. In contrast, when the ratio of dolomite catalyst to feedstock exceeds 2, problems of operation may occur. Thus, it is effective to use a ratio of mass catalyst/mass of subjected feedstock higher than 0.15 and not over 2.

By increasing the reaction temperature from 250° C. to 450° C., the yield of liquid hydrocarbon will increase. However, if reaction temperature exceeds 450° C., the liquid hydrocarbon yield decreases and those of the gaseous hydrocarbons increase, which is not desirable. As the temperature increases to 600° C. or higher, this tendency is conspicuous, which is not desirable.

When the feedstock is heated together with the catalyst, it is preferred that the reaction time is set from about 15 minutes to about 5 hours, preferably 0.5 to 3 hours. The liquid cracked oil yield increases with increasing reaction time from 15 minutes to about 1 hour. The yield also depends on the reaction temperature. More specifically, the higher reaction temperature causes a large quantity of naphtha production because the catalytic cracking caused by the severe operational conditions favors a large number of hydrogen transfer reactions. Consequently, a large quantity of aromatic compound is generated. The liquid hydrocarbon is subjected to distillation gas chromatography (GC) according to ASTM D 2887, wherein the relation of GC retention time to boiling point is calibrated by a standard n-paraffin mixture, and the yield of four different cuts, from initial boiling point to 200° C. (naphtha), 200-250° C. (kerosene), 250-350° C. (gas oil), and greater than 350° C. (residual oil), is determined.

According to the present invention, the raw material or feedstock may contain residual hydrocarbon oil obtained from pyrolysis of plastic waste aside from triglycerides from natural oil. Examples of plastic waste to which the present invention is applicable are polyethylene, polypropylene, and polystyrene.

Preferably, the percent by weight between the amount of triglycerides and residual hydrocarbon oil present in the raw material is up to 100% by weight, more preferably 50% by weight.

In a pyrolysis process of plastics or plastic wastes, shredded mixed plastics are heated at 300 to 450° C., preferably at around 375° C. for 0.5 to 3 hours, preferably for about 3 hours in the absence of oxygen and depolymerized back into a liquid, to obtain the residual hydrocarbon oil having a heavy oil content of 80-95%.

In the present invention, if desired, a pyrolysis of plastic waste is first conducted. FIG. 1 shows a schematic flow chart of the process according to an embodiment of the present invention. As seen in the FIG. 1, from the pyrolysis reactor, residual hydrocarbon oil is obtained. Then the residual hydrocarbon oil which is the resulting material of the plastic pyrolysis process is blended with oil/fats from another source, and the mixture is heated with dolomite catalyst at a temperature from about 250° C. to about 600° C. in a slurry reactor with high shear mixing. The blending may be done in a stainless steel slurry reactor at an elevated temperature with high shear mixing, both to improve the ease of mixing and the uniformity of the dispersion of the solid material in the oil mixture. Suitable temperatures may range from about 300° C. to about 500° C., preferably from about 380° C. to about 450° C. The high shear mixing can be obtained by using conventional high-shear mixing equipment known in the art. Reactions are carried out with a mixing ratio of mass of catalyst (g)/mass of oil (g) being 0.15:1 to 2:1. The preferable ratio of catalyst/oil is about 0.5:1 to 1:1.

Yield of liquid hydrocarbon in the above reaction increases as the reaction temperature increases. In addition, coke formation decreases as the reaction temperature increases. However, at the temperature higher than 450° C., the liquid hydrocarbon yield decreases, which is not desirable. Moreover, as the temperature increases to 550° C. or higher, this tendency is conspicuous, which is not desirable.

The residual hydrocarbon oil from plastic pyrolysis and triglycerides which are long chain or cross-linked hydrocarbon molecules are converted into lighter hydrocarbons by thermal cracking. At the same time, by catalytic cracking with the dolomite catalyst, which improves cracking and isomerisation, a lighter hydrocarbon is cracked into naphtha.

The description of this process, as well as the figures and tables in this document, shows advantages of this invention in view of a low cost operating condition process by using natural dolomite and natural oil/fat loaded with residual hydrocarbon oil resulting from plastic waste pyrolysis process to obtain high quality oil for fuel, which comprises mainly light and heavy naphtha and gas oil.

As discussed above, the process of this invention can achieve catalytic cracking of vegetable oil with high efficiency to obtain high quality oil for fuel, which comprises mainly light and heavy naphtha, by using a very low cost catalyst.

EXAMPLES

The present invention will be described in more detail by reference to the following examples. The present invention shall not be construed to be limited to these examples.

The composition of the dolomite catalyst used in each example is shown in the following Table 1.

TABLE 1

| Chemical composition of dolomite catalyst (% by weight) | |
|---|---|
| $MgCO_3 \geqq$ | 41% |
| $CaCO_3 \geqq$ | 58% |
| SiO | 0.258% |
| $Al_2O_3$ | 0.126% |
| $Fe_2O_3$ | 0.133% |
| SrO | 0.018% |

Example 1

In this example, catalytic cracking of palm oil experiments were carried out in a slurry reactor. The catalyst used in each experiment was prepared by calcining 400 g of the natural ore dolomite at a temperature of 900° C. for 6 hours. After being calcined, 20 g of calcined dolomite was put in a stainless steel slurry reactor, blending it with 20 g of palm oil. The reactor was heated to the reaction temperatures shown in Table 2. The result of catalytic cracking of the palm oil was compared at temperatures ranging from 380 to 450° C. The reaction was conducted for 3 hours, after which the agitation was turned off, while the $N_2$ was flowed for another hour at 15 ml/min to remove the remaining products. The gas products exiting the reactor were further cooled with a condenser system. They were then fractioned into liquid and gas. The liquid hydrocarbon product was analyzed by distillation gas chromatography according to ASTM D 2887. From the GC, the fractions of naphtha and gas oil were determined. The liquid hydrocarbon yields obtained were in the range of 34.9 to 49.1% by wt. of the starting material used. The amount of coke deposited on the catalyst after each experiment was examined. The spent catalyst was weighed by using a microbalance. It was then heated to 600° C. in a furnace for 6 hours. The spent catalyst was then re-weighed. The difference in the weight of the spent catalyst before and after burning is termed as the weight of coke that is burned off. The results are shown in Table 2.

TABLE 2

| | Reaction temperature | |
|---|---|---|
| Experiment | 380° C. | 450° C. |
| Yield of liquid hydrocarbon (wt. %) | 34.9 | 49.1 |
| Coke (wt. %) | 42.1 | 16.3 |
| $H_2O$ (wt. %) | 3.4 | 2.7 |
| Gas (wt. %) | 19.6 | 31.9 |
| Total | 100.0 | 100.0 |
| Fractions (wt. %) of liquid hydrocarbon product | | |
| Light Naphtha (100° C.) | — | 12.8 |
| Heavy Naphtha (100-200° C.) | 39.5 | 41.9 |
| Kerosine (200-250° C.) | 25.6 | 18.9 |
| Gas oil (250-350° C.) | 32.6 | 24.5 |
| Residual Oil (>350° C.) | 1.8 | 1.3 |

Example 2

In this example, catalytic cracking of soybean oil experiments were carried out in a slurry reactor. The catalyst used in this Example 2 was prepared in the same proportions and in the same manner as in Example 1. The catalytic cracking reaction procedure of Example 2 was the same as in Example 1. The liquid hydrocarbon yields obtained were in the range of 27.7 to 48.1% by wt. of the starting material used. From the GC, the fractions of naphtha and gas oil were determined. The results are shown in Table 3.

TABLE 3

| Experiment | Reaction temperature | |
| --- | --- | --- |
| | 380° C. | 450° C. |
| Yield of liquid hydrocarbon (wt. %) | 27.7 | 48.1 |
| Coke (wt. %) | 55.0 | 25.0 |
| $H_2O$ (wt. %) | 4.4 | 3.9 |
| Gas (wt. %) | 12.9 | 23.0 |
| Total | 100.0 | 100.0 |
| Fractions (wt. %) of liquid hydrocarbon product | | |
| Light Naphtha (100° C.) | — | 15.6 |
| Heavy Naphtha (100-200° C.) | 31.5 | 41.0 |
| Kerosine (200-250° C.) | 29.6 | 19.9 |
| Gas oil (250-350° C.) | 36.7 | 22.5 |
| Residual Oil (>350° C.) | 1.6 | 0.4 |

Example 3

In this example, catalytic cracking of palm oil experiments were carried out in a slurry reactor by using the catalyst at different ratios of mass of catalyst/mass of palm oil. The ratio of mass catalyst/mass of palm oil was in the range of 0.25 to 1. The catalyst used in this Example 3 was prepared in the same proportions and in the same manner as in Example 1. The catalytic cracking reaction procedure of Example 3 was the same as in Example 1 except the reaction temperature was set at 400° C. The obtained liquid oil yields were in the range of 44.2 to 54.4% by wt. of the starting material used. From the GC, the fractions of naphtha and gas oil were determined. The results are shown in Table 4.

TABLE 4

| Experiment | Mass of catalyst/mass of palm oil | | | |
| --- | --- | --- | --- | --- |
| | 0.25 | 0.5 | 0.75 | 1 |
| Yield of liquid hydrocarbon (wt. %) | 45.9 | 54.4 | 44.2 | 47.0 |
| Coke (wt. %) | 36.2 | 49.4 | 43.4 | 30.3 |
| $H_2O$ (wt. %) | 3.8 | 4.3 | 4.9 | 3.9 |
| Gas (wt. %) | 14.1 | 8.1 | 7.5 | 12.8 |
| Total | 100.0 | 100.0 | 100.0 | 100.0 |
| Fractions (wt. %) of liquid hydrocarbon product | | | | |
| Light Naphtha (100° C.) | 9.7 | 7.3 | 5.5 | 5.8 |
| Heavy Naphtha (100-200° C.) | 36.1 | 33.6 | 31.8 | 35.4 |
| Kerosine (200-250° C.) | 24.3 | 23.9 | 23.4 | 24.6 |
| Gas oil (250-350° C.) | 28.2 | 32.9 | 36.6 | 32.0 |
| Residual Oil (>350° C.) | 1.1 | 1.5 | 2.1 | 1.4 |

Example 4

In this example, catalytic cracking of vegetable oil experiments were carried out in a slurry reactor. The raw material for each experiment was grape seed oil, corn oil, and rice bran oil. The catalyst used in this Example 4 was prepared in the same proportions and in the same manner as in Example 1. The catalytic cracking reaction procedure of Example 4 was the same as in Example 1 except the reaction temperature was set at 450° C. The liquid hydrocarbon yields obtained were in the range of 47.8 to 54.2% by wt. of the starting material used. From the GC, the fractions of naphtha and gas oil were determined. The results are shown in Table 5.

TABLE 5

| Experiment | Vegetable oil | | |
| --- | --- | --- | --- |
| | Corn | Rice bran | Grape seed |
| Yield of liquid hydrocarbon (wt. %) | 51.5 | 47.8 | 54.2 |
| Coke (wt. %) | 27.5 | 26.0 | 27.5 |
| $H_2O$ (wt. %) | 2.7 | 3.1 | 3.3 |
| Gas (wt. %) | 18.3 | 23.1 | 15.0 |
| Total | 100.0 | 100.0 | 100.0 |
| Fractions (wt. %) of liquid hydrocarbon product | | | |
| Light Naphtha (100° C.) | 12.1 | — | 9.0 |
| Heavy Naphtha (100-200° C.) | 39.4 | 42.8 | 37.3 |
| Kerosine (200-250° C.) | 21.2 | 25.8 | 21.4 |
| Gas oil (250-350° C.) | 24.6 | 28.7 | 29.8 |
| Residual Oil (>350° C.) | 2.1 | 2.2 | 1.9 |

Example 5

In this example, the plastic waste consisting of 40 g of polystyrene, 10 g of polyethylene and 10 g of polypropylene, a total of 60 g was subjected to pyrolysis process. The pyrolysis reactor was heated to a temperature of 375° C. for 3 hours. Residual hydrocarbon oil obtained was then used as a raw material for catalytic cracking process.

In a slurry reactor, the catalytic cracking blends of the residual hydrocarbon oil made from a plastic waste pyrolysis process with palm oil or soybean oil using dolomite catalyst was performed. The experiments were done in a reactor in which 10 g of residual hydrocarbon oil mixed together with 10 g of palm oil or soybean oil. The mass of oil/mass of catalyst was 1:1. The catalyst used in this Example 5 was prepared in the same proportions and in the same manner as in Example 1. The catalytic cracking reaction procedure of Example 5 was the same as in Example 1 except the reaction temperature was set at 450° C. The liquid hydrocarbon yields obtained were in the range of 46.1 to 52.1% by wt. of the starting material used. From the GC, the fractions of naphtha and gas oil were determined. The results are shown in Table 6.

TABLE 6

| Experiment | 10 g of hydrocarbon oil + 10 g of palm oil | 10 g of hydrocarbon oil + 10 g of soybean oil |
| --- | --- | --- |
| Yield of liquid hydrocarbon (wt. %) | 46.1 | 52.1 |
| Coke (wt. %) | 26.0 | 22.0 |
| $H_2O$ (wt. %) | 1.1 | 1.4 |
| Gas (wt. %) | 26.8 | 24.5 |
| Total | 100.0 | 100.0 |
| Fractions (wt. %) of liquid hydrocarbon product | | |
| Light Naphtha (100° C.) | 26.2 | 21.5 |
| Heavy Naphtha (100-200° C.) | 49.9 | 49.7 |
| Kerosine (200-250° C.) | 7.4 | 10.0 |
| Gas oil (250-350° C.) | 11.5 | 15.7 |
| Residual Oil (>350° C.) | 4.3 | 2.4 |

Example 6

In this example, the residual hydrocarbon oil used as a raw material for catalytic cracking process was prepared in the same proportions and in the same manner as in Example 5.

In a slurry reactor, the catalytic cracking blends of the residual hydrocarbon oil made from a plastic waste pyrolysis process with palm oil using dolomite catalyst was performed. The experiments were done in a reactor in which 10 g of residual hydrocarbon oil mixed together with 10 g of palm oil. The result of catalytic cracking of the palm oil was compared when the mass of oil/mass of catalyst was 0.5:1 to 1:1. The catalyst used in this Example 6 was prepared in the same proportions and in the same manner as in Example 1. The catalytic cracking reaction procedure of Example 6 was the same as in Example 1 except the reaction temperature was set at 450° C. The liquid hydrocarbon yields obtained were in the range of 41.8 to 50.1% by wt. of the starting material used. From the GC, the fractions of naphtha and gas oil were determined. The results are shown in Table 7.

TABLE 7

| Experiment | mass of oil/mass of catalyst | | |
|---|---|---|---|
| | 0.5:1 | 0.75:1 | 1:1 |
| Yield of liquid hydrocarbon (wt. %) | 50.0 | 41.8 | 46.1 |
| Coke (wt. %) | 21.0 | 26.0 | 26.0 |
| H$_2$O (wt. %) | 1.7 | 1.5 | 1.1 |
| Gas (wt. %) | 27.3 | 30.7 | 26.8 |
| Total | 100.0 | 100.0 | 100.0 |
| Fractions (wt. %) of liquid hydrocarbon product | | | |
| Light Naphtha (100° C.) | 43.2 | 39.4 | 26.2 |
| Heavy Naphtha (100-200° C.) | 26.4 | 27.6 | 49.9 |
| Kerosine (200-250° C.) | 5.3 | 5.8 | 7.4 |
| Gas oil (250-350° C.) | 19.1 | 21.0 | 11.5 |
| Residual Oil (>350° C.) | 5.4 | 5.6 | 4.3 |

Example 7

In this example, catalytic cracking of pig oil experiments were carried out in a slurry reactor. The raw material for each experiment was pig oil. The catalyst used in this Example 7 was prepared in the same proportions and in the same manner as in Example 1. The catalytic cracking reaction procedure of Example 7 was the same as in Example 1 except the reaction temperature was set at 450° C. The liquid hydrocarbon yields obtained were 36.7% by wt. of the starting material used. From the GC, the fractions of naphtha and gas oil were determined. The results are shown in Table 8.

TABLE 8

| Experiment | Result |
|---|---|
| Yield of liquid hydrocarbon (wt. %) | 36.7 |
| Coke (wt. %) | 23.2 |
| H$_2$O (wt. %) | 5.4 |
| Gas (wt. %) | 34.7 |
| Total | 100.0 |
| Fractions (wt. %) of liquid hydrocarbon product | |
| Light Naphtha (100° C.) | 9.3 |
| Heavy Naphtha (100-200° C.) | 42.2 |
| Kerosine (200-250° C.) | 13.1 |
| Gas oil (250-350° C.) | 18.2 |
| Residual Oil (>350° C.) | 3.9 |

Example 8

In this example, catalytic cracking of pig oil and palm oil experiments were carried out in a slurry reactor. The raw material for each experiment was pig oil mixed with palm oil and the mass of natural oil/mass of natural fat was 1:1. The catalyst used in this Example 8 was prepared in the same proportions and in the same manner as in Example 1. The catalytic cracking reaction procedure of Example 8 was the same as in Example 1. The result of catalytic cracking was compared at temperatures ranging from 380 to 450° C. The liquid hydrocarbon yields obtained were 25.1-35.9% by wt. of the starting material used. From the GC, the fractions of naphtha and gas oil were determined. The results are shown in Table 9.

TABLE 9

| Experiment | 450° C. | 380° C. |
|---|---|---|
| Yield of liquid hydrocarbon (wt. %) | 35.9 | 25.1 |
| Coke (wt. %) | 28.0 | 43.8 |
| H$_2$O (wt. %) | 5.6 | 6.6 |
| Gas (wt. %) | 30.5 | 24.5 |
| Total | 100.0 | 100.0 |
| Fractions (wt. %) of liquid hydrocarbon product | | |
| Light Naphtha (100° C.) | 9.3 | 6.1 |
| Heavy Naphtha (100-200° C.) | 42.2 | 26.5 |
| Kerosine (200-250° C.) | 10.7 | 17.4 |
| Gas oil (250-350° C.) | 27.8 | 37.0 |
| Residual Oil (>350° C.) | 8.6 | 10.6 |

Example 9

In this example, the residual hydrocarbon oil used as a raw material for catalytic cracking process was prepared in the same proportions and in the same manner as in Example 5.

In a slurry reactor, the catalytic cracking of blends of the residual hydrocarbon oil made from a plastic waste pyrolysis process with pig oil using dolomite catalyst was performed. The experiments were done in a reactor in which 10 g of residual hydrocarbon oil mixed together with 10 g of pig oil. The mass of oil/mass of catalyst was 1:1. The catalyst used in this Example 9 was prepared in the same proportions and in the same manner as in Example 1. The catalytic cracking reaction procedure of Example 9 was the same as in Example 1. The result of catalytic cracking was compared at temperatures ranging from 380 to 450° C. The liquid hydrocarbon yields obtained were in the range of 46.1 to 52.1% by wt. of the starting material used. From the GC, the fractions of naphtha and gas oil were determined. The results are shown in Table 10.

TABLE 10

| Experiment | 450° C. | 380° C. |
|---|---|---|
| Yield of liquid hydrocarbon (wt. %) | 46.1 | 43.3 |
| Coke (wt. %) | 15.8 | 45.0 |
| H$_2$O (wt. %) | 4.3 | 5.4 |
| Gas (wt. %) | 33.8 | 6.3 |
| Total | 100.0 | 100.0 |
| Fractions (wt. %) of liquid hydrocarbon product | | |
| Light Naphtha (100° C.) | 22.5 | 11.2 |
| Heavy Naphtha (100-200° C.) | 45.2 | 49.3 |
| Kerosine (200-250° C.) | 10.6 | 13.5 |
| Gas oil (250-350° C.) | 17.2 | 22.2 |
| Residual Oil (>350° C.) | 3.8 | 3.1 |

While the invention has been described in detail and with reference to specific embodiments thereof, it will be apparent to one skilled in the art that various changes can be made without departing from the spirit and scope thereof.

What is claimed is:

1. A process for producing fuel from vegetable oil by using a dolomite catalyst comprising:
   (a) providing a raw material containing vegetable oil for cracking, and
   (b) performing pyrolysis for cracking the raw material by (i) contacting said raw material with a dolomite catalyst to form a liquid material containing said raw material and said dolomite catalyst, and (ii) cracking said liquid material in a reactor by mixing said liquid material at a temperature from about 250° C. to about 600° C.,
   wherein the dolomite catalyst is prepared by calcining natural ore dolomite at a temperature of 900° C. or above.

2. A process according to claim 1, wherein said raw material contains natural fat.

3. A process according to claim 1, wherein said vegetable oil is selected from the group consisting of palm oil, soybean oil, grape seed oil, olive oil, sunflower oil, corn oil, sesame oil, and rice bran oil.

4. A process according to claim 1, wherein said vegetable oil is pure or wasted.

5. A process according to claim 1, wherein the pyrolysis is performed for about 10 minutes to about 4 hours.

6. A process according to claim 1, further comprising cooling gas products obtained by cracking said raw material with a condenser system to fraction into liquid and gas.

7. A process according to claim 6, further comprising fractioning said gas products into light naphtha, heavy naphtha, kerosene, light gas oil, heavy gas oil and gas.

8. A process according to claim 1, wherein said catalyst is in an oxidized state.

9. A process according to claim 2, wherein the weight ratio between the vegetable oil and natural fat is 1 to 1.

10. A process for producing fuel comprising:
    (a) providing a raw material by mixing vegetable oil and/or natural fat,
    (b) performing pyrolysis of plastic waste material to produce a residual hydrocarbon oil as a raw material for cracking, and
    (c) mixing the raw materials from steps (a) and (b) for cracking with a dolomite catalyst to form a liquid material containing the raw materials and the dolomite catalyst, and cracking said liquid material in a reactor by mixing said liquid material at a temperature from about 250° C. to about 600° C.,
    wherein the dolomite catalyst prepared by calcining natural ore dolomite at a temperature of 900° C. or above.

11. A process according to claim 10, wherein said plastic waste material is at least one of polyethylene, polystyrene or polypropylene.

12. A process according to claim 10, wherein the pyrolysis of the plastic waste material is performed at a temperature from about 300 to 500° C.

13. A process according to claim 10, wherein the pyrolysis is performed for about 15 minutes to about 4 hours.

14. A process according claim 10, wherein the vegetable oil or natural fat is used in a proportion by weight of between greater than 0% and less than 100% in relation to a residual hydrocarbon oil.

15. A process according to claim 10, wherein the duration of the cracking of said raw material with the dolomite catalyst is from about 10 minutes to about 5 hours.

16. A process according to claim 10, wherein said residual hydrocarbon oil obtained in the pyrolysis step has a heavy oil content of 80 to 95%.

\* \* \* \* \*